(12) United States Patent
Weinstein et al.

(10) Patent No.: US 10,925,330 B2
(45) Date of Patent: Feb. 23, 2021

(54) AIR BAG MECHANISM

(71) Applicant: Hip Hope Technologies Ltd., Hod HaSharon (IL)

(72) Inventors: Erez Weinstein, Shavei Zion (IL); Alex Feldman, Haifa (IL); Ran Manor, Tal Shahar (IL)

(73) Assignee: Hip Hope Technologies Ltd., Hod-HaSharon (IL)

( * ) Notice: Subject to any disclaimer, the term of this patent is extended or adjusted under 35 U.S.C. 154(b) by 662 days.

(21) Appl. No.: 15/525,064

(22) PCT Filed: Nov. 9, 2015

(86) PCT No.: PCT/IB2015/058630
§ 371 (c)(1),
(2) Date: May 7, 2017

(87) PCT Pub. No.: WO2016/071886
PCT Pub. Date: May 12, 2016

(65) Prior Publication Data
US 2019/0150532 A1    May 23, 2019

Related U.S. Application Data

(60) Provisional application No. 62/077,242, filed on Nov. 9, 2014.

(51) Int. Cl.
*A41D 13/018* (2006.01)
*A45F 3/00* (2006.01)
*B60R 21/274* (2011.01)

(52) U.S. Cl.
CPC ............ *A41D 13/018* (2013.01); *A45F 3/005* (2013.01); *B60R 21/274* (2013.01)

(58) Field of Classification Search
CPC ...... A41D 13/018; A45F 3/005; B60R 21/247
(Continued)

(56) References Cited

U.S. PATENT DOCUMENTS 2,849,159 A * 8/1958 Kaufmann .......... A47L 15/4418
                                                222/309
5,145,208 A * 9/1992 Hoagland ............... B60R 21/01
                                                180/274
(Continued)

FOREIGN PATENT DOCUMENTS

WO    WO-2012104833 A2 * 8/2012 ............ A41D 1/002

*Primary Examiner* — Timothy L Maust
*Assistant Examiner* — James R Hakomaki
(74) *Attorney, Agent, or Firm* — Dr. Hanan Farber Patent Agent Ltd.

(57) ABSTRACT

An apparatus for inflating an air bag of a protection device. The apparatus includes a canister including a first compartment and a second compartment. The first compartment is adapted to contain a compressed gas. A seal is between the first compartment and the second compartment which is adapted to seal the compressed gas inside the first compartment. The second compartment includes a two-step mechanism configured to break the seal to cause thereby an initial gas flow from the first compartment into the second compartment. The initial gas flow causes a wide opening in place of the seal to be created for rapid gas flow through the second compartment and into the air bag to rapidly expand the air bag.

16 Claims, 8 Drawing Sheets

(58) Field of Classification Search
USPC .......................................................... 141/10
See application file for complete search history.

(56) References Cited

U.S. PATENT DOCUMENTS

| | | | | |
|---|---|---|---|---|
| 5,683,105 A * | 11/1997 | Jackson | ................ | B60R 21/268 |
| | | | | 222/3 |
| 5,906,394 A * | 5/1999 | Van Wynsberghe | .... | F16K 13/04 |
| | | | | 222/5 |
| 6,234,522 B1 * | 5/2001 | Albrecht | ............... | B60R 21/272 |
| | | | | 280/737 |
| 6,332,404 B1 * | 12/2001 | Rink | .................... | B60R 21/264 |
| | | | | 102/530 |
| 6,908,106 B2 * | 6/2005 | Campbell | ............. | B60R 21/268 |
| | | | | 280/741 |
| 7,748,737 B2 * | 7/2010 | Hall | ........................ | B60R 21/01 |
| | | | | 251/129.15 |
| 8,870,222 B2 * | 10/2014 | Kobayashi | ............ | B60R 21/274 |
| | | | | 280/736 |
| 9,751,492 B2 * | 9/2017 | Kobayashi | ............. | F16K 13/04 |
| 9,879,950 B2 * | 1/2018 | Moon | ..................... | F17C 13/06 |
| 2010/0032605 A1 * | 2/2010 | Haege | .................... | F17C 13/04 |
| | | | | 251/324 |
| 2016/0183607 A1 * | 6/2016 | Lopez Yunez | ....... | A41D 13/018 |
| | | | | 2/455 |

* cited by examiner

AIR BAG MECHANISM

BACKGROUND

1. Technical Field

The present invention relates to an air-bag mechanism and methods of activating the air-bag mechanism.

2. Description of Related Art

Each year, millions of elderly people around the world (especially women) experience falls resulting in hip fractures (mainly, femoral neck fractures). Hip fractures in the elderly result in physical suffering, loss of independence, a deteriorating mental state and high mortality rate.

US patent application publication, US20130312168 of the present Applicant, discloses an active hip protector system and method for hip fracture prevention including a belt-like pouch, worn over the user's waist, containing airbags which are inflated to a large size ensuring that the user's thighs will not hit the ground upon impact, once the system detects a fall. The pouch contains distance measurement sensors, acceleration and spatial orientation sensors. A pneumatic system, including the airbags, is carried within the pouch or in another location. Alternatively, a pneumatic system may be split from the pouch, but is positioned elsewhere on the wearer or in the wearer's close vicinity in a stationary or mobile position, such as on the floor or the walls or other objects located in a room of a house or inside a bath or a shower. Communication with the pneumatic system may be achieved wirelessly using a short-range communication protocol and the pouch in this case may contain a suitable transmitter.

In automotive air bag restraint systems, there are basically two methods or systems which are employed to supply gas. In the first method, the inflating gas may be provided as a compressed gas within a pressure vessel. In the second method, the bag may be inflated by igniting a pyrotechnic gas-generating propellant composition and directing the resultant gaseous combustion products into the bag. These two methods create three categories of inflators, the first relies solely upon a pressurized reservoir of gas, the second upon burning a combustible propellant to generate all of the gas to fill the air bag, the third upon a combination of the two described methods to inflate the air bag, and is known in the art as a hybrid inflator.

The first method uses a reservoir of gas stored on-board the vehicle at a very high pressure. To open the pressure vessel in the short time interval required to inflate the air bag, explosive actuated arrangements are employed for bursting a diaphragm or cutting through a structural portion of the reservoir. In the second method, a pyrotechnic gas generator having an ignitable and rapid-burning gas-generating propellant composition burns to produce substantial volumes of hot gaseous products which are directed into the inflatable bag. These gas generators are designed to withstand thermal and mechanical stresses during the gas-generating process. Specifically, the gas-generating propellant ignites, combusts and burns at elevated temperatures and pressures which require the casing (pressure vessel) surrounding the gas-generant to be capable of safely withstanding these elevated pressures at a specified safety factor. These strength requirements may result in a large, bulky and heavy inflator. The third method uses a hybrid inflation system with a gas-generating propellant composition and a pressurized medium.

BRIEF SUMMARY

Various air-bag mechanisms and methods are provided for herein. The mechanisms include a canister including a first compartment and a second compartment. The first compartment is adapted to contain a compressed gas. A seal between the first compartment and the second compartment seals the compressed gas inside the first compartment. The second compartment includes a moveable support adjacent to the seal and adapted to support the seal in a non-activated position. A puncture mechanism is configured to puncture the seal to cause thereby an initial gas flow from the first compartment into the second compartment. The initial gas flow subsequent to puncture presses on and moves the moveable support to an activated position away from supporting the seal. In absence of the moveable support adjacent to the seal, the seal breaks open in response to pressure and/or gas flow from the first compartment to the second compartment to enable rapid gas flow from the first compartment into the second compartment. An aperture may be located in a wall of the second compartment. The moveable support in the non-activated position is configured to block the aperture and in the activated position the moveable support is configured to unblock the aperture to allow gas in the second compartment to escape externally from the canister. An air bag including a mouth may be hermetically attachable external to the canister. The aperture may be internal to the airbag so that the escaped gas through the aperture from the second compartment enters the air bag. Alternatively, the air bag may completely hermetically enclose the canister or a pneumatic pipe may be hermetically attached between the mouth of the air bag and the aperture. The seal may include a foil located between the first compartment and the second compartment. The puncture mechanism may include a solenoid adapted to move a plunger. The plunger is configured to initially puncture the seal to cause the initial gas flow. Alternatively, the puncture mechanism may include a compressed spring coupled to a needle. When the spring is decompressed, the needle may be configured to initially puncture the seal to cause the initial gas flow. The moveable support may include a piston. The canister may include a cylinder having a longitudinal axis and movement of the piston within the cylinder is along the longitudinal axis of the cylinder. The initial gas flow may flow at least in part through a bore in the piston and force the piston to move along the longitudinal axis of the cylinder. The apparatus may be wearable by a user to protect the user from injury. The apparatus may be activated prior to impact with the ground. The rapid gas flow from the first compartment into the second compartment may be enabled while avoiding use of an explosive or pyrotechnics.

Various systems and methods are provided for herein for a mechanism to activate the inflation of an air bag of a protection device upon detection of a fall of the user. The mechanism may include a canister including a first and a second compartment. The first compartment may be adapted to contain a compressed gas sealed in the first compartment by a foil seal. The second compartment may include a piston adapted to be moveable within the second compartment between the solenoid and the foil seal. The piston may be located next to the foil seal to assist the foil seal to contain the compressed gas sealed in the first compartment when the mechanism is not activated. The piston may be located next to the foil seal when the mechanism is not activated to inflate the air bag. The second compartment may further include a solenoid adapted to move a plunger which may be responsive to detection of a fall of the user and puncture the foil seal by the movement of the plunger thereby. An aperture may be located in a wall of the second compartment between the solenoid and the foil seal. Upon activation of the mechanism and puncture of the foil seal, subsequent movement of the piston towards the solenoid may cause a wide opening of the aperture to allow rapid gas flow through the second compartment into the air bag. The air bag may may enclose the second compartment and the opening of the air bag may be hermetically attached around the periphery of the first compartment. A pneumatic pipe may be hermetically attached between the air bag and the aperture.

Various methods are provided for herein which utilize the mechanism which may detect a fall of a user who may be wearing the protection device. Alternatively, the airbag and mechanism may be located in vicinity of the user and may be activated by wireless communications when a fall is detected. When a fall of the user is detected, the solenoid may be activated to move the plunger through a hole in the piston which in turn pierces the foil seal, to release thereby an initial flow of gas through the aperture. The release of the initial flow of gas through the aperture moves the piston towards the solenoid which creates a pathway for the compressed gas to exit rapidly from the canister and inflate the airbag.

Various methods are provided for herein for the expansion of an air bag of a protection device. A canister is provided which includes a first compartment and a second compartment. The first compartment is adapted to contain a compressed gas. A seal between the first compartment and the second compartment adapted to seal the compressed gas inside the first compartment. When a fall is detected for example, the seal may be broken to cause thereby an initial gas flow from the first compartment into the second compartment. The initial gas flow causes a wide opening to be created for rapid gas flow through the second compartment and into the air bag to rapidly expand the air bag. The air bag may enclose the second compartment and the opening of the air bag may be hermetically attached around the periphery of the first compartment.

Various apparati are provided for herein for inflating an air bag of a protection device which may be wearable by a user. Alternatively, the airbag and apparatus may be located in vicinity of the user and may be activated by wireless communications when a fall is detected. The air bag may inflate upon detection of a fall of the user. The apparatus includes a canister which further includes a first compartment and a second compartment. The first compartment is adapted to contain a compressed gas. A seal is between the first compartment and the second compartment which is adapted to seal the compressed gas inside the first compartment. The second compartment includes a two-step mechanism configured to break the seal to cause thereby an initial gas flow from the first compartment into the second compartment. The initial gas flow causes a wide opening in place of the seal to be created for rapid gas flow through the second compartment and into the air bag to rapidly expand the air bag. The seal may include a foil disposed between the first compartment and the second compartment. The two-step mechanism includes a solenoid adapted to move a plunger which may be responsive to detection of a fall of the user. The plunger is configured to initially break the seal to cause the initial gas flow. A piston is disposed within the second compartment between the solenoid and the foil seal. Prior to breaking the seal, the piston is located next to the foil seal to support the foil seal for containing the compressed gas sealed in the first compartment. Subsequent to breaking the seal, the piston is forced away from the foil seal by the initial gas flow. An aperture located in a wall of the second compartment between the solenoid and the foil seal is unblocked when the piston moves away from the foil soil enabling the gas to escape externally. The air bag may enclose the second compartment and the opening of the air bag may be hermetically attached around the periphery of the first compartment. Alternatively a pneumatic pipe may be hermetically attached between the air bag and the aperture.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein.

DETAILED DESCRIPTION

Figure 1:
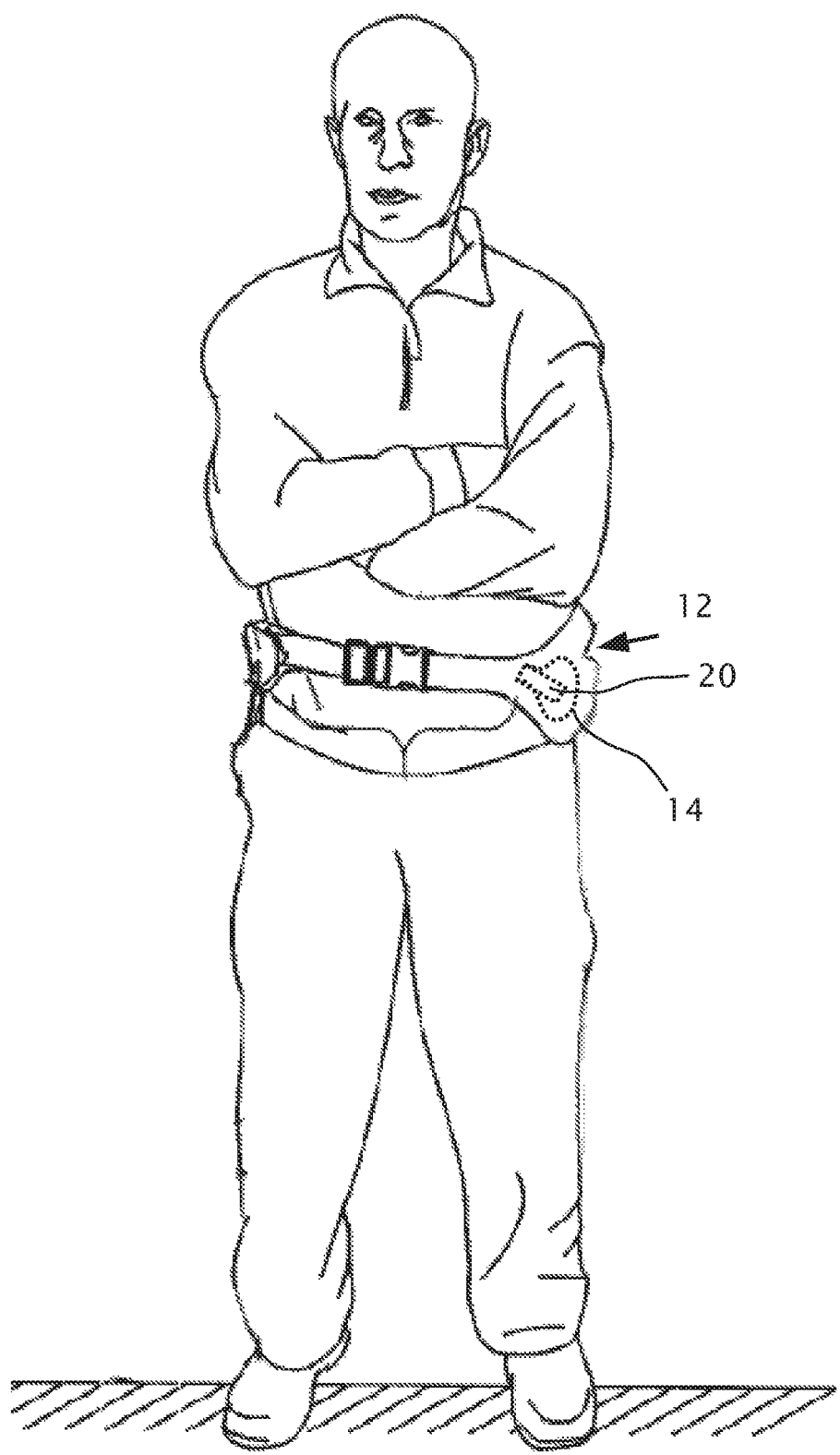
FIG. 1 illustrates a fall detection device worn by a person, according to a feature of the present invention.

Reference will now be made in detail to features of the present invention, examples of which are illustrated in the accompanying drawings, wherein like reference numerals refer to like elements throughout. The features are described below to explain the present invention by referring to the figures.

Before explaining features of the invention in detail, it is to be understood that the invention is not limited in its application to the details of design and the arrangement of the components set forth in the following description or illustrated in the drawings. The invention is capable of other features or of being practiced or carried out in various ways. Also, it is to be understood that the phraseology and terminology employed herein is for the purpose of description and should not be regarded as limiting.

By way of introduction, aspects of the present invention are directed to a mechanism for safe rapid inflation of an air bag or other inflatable impact absorption device known in the art which are part of a protection device worn by a user or placed in the vicinity of the user as disclosed in US20130312168. The present invention in its various aspects and embodiments seeks to provide a mechanism operable to rapidly inflate an air bag without using explosives or pyrotechnics as generally used in automotive air bag restraint systems of the prior art. Specifically, the use of pyrotechnics and/or explosives for expanding an airbag may be unsafe or at least deter a user from using an active hip protector system for personal use. Such a mechanism may provide an improved, i.e. safer automotive air bag restraint system and/or may be employed for bicyclist safety, motorcyclist safety and/or safety in various sports according to various features of the present invention. The system disclosed in US20130312168 may be adapted to protect against injuries other than or in addition to hip fractures such as spinal cord injuries and head injuries according to various aspects of the present invention.

Referring now to the drawings, reference is now made to FIG. 1 which illustrates a protection belt 12 worn by a person, according to features of the present invention. Protection belt 12 is shown worn around the waist of the person. Shown in dotted line, located inside belt 12 is canister 20 and air bag 14. Canister 20 and air bag 14 attached to canister 20 are located in belt 12 so that a hip of the person is protected (if the person falls) by air bag 14 being rapidly expanded by compressed gas released from canister 20 into air bag 14. The decision to inflate air bag 14 may be made by fall sensing and control circuitry (not shown) located in protection belt 12.

Figure 2A:
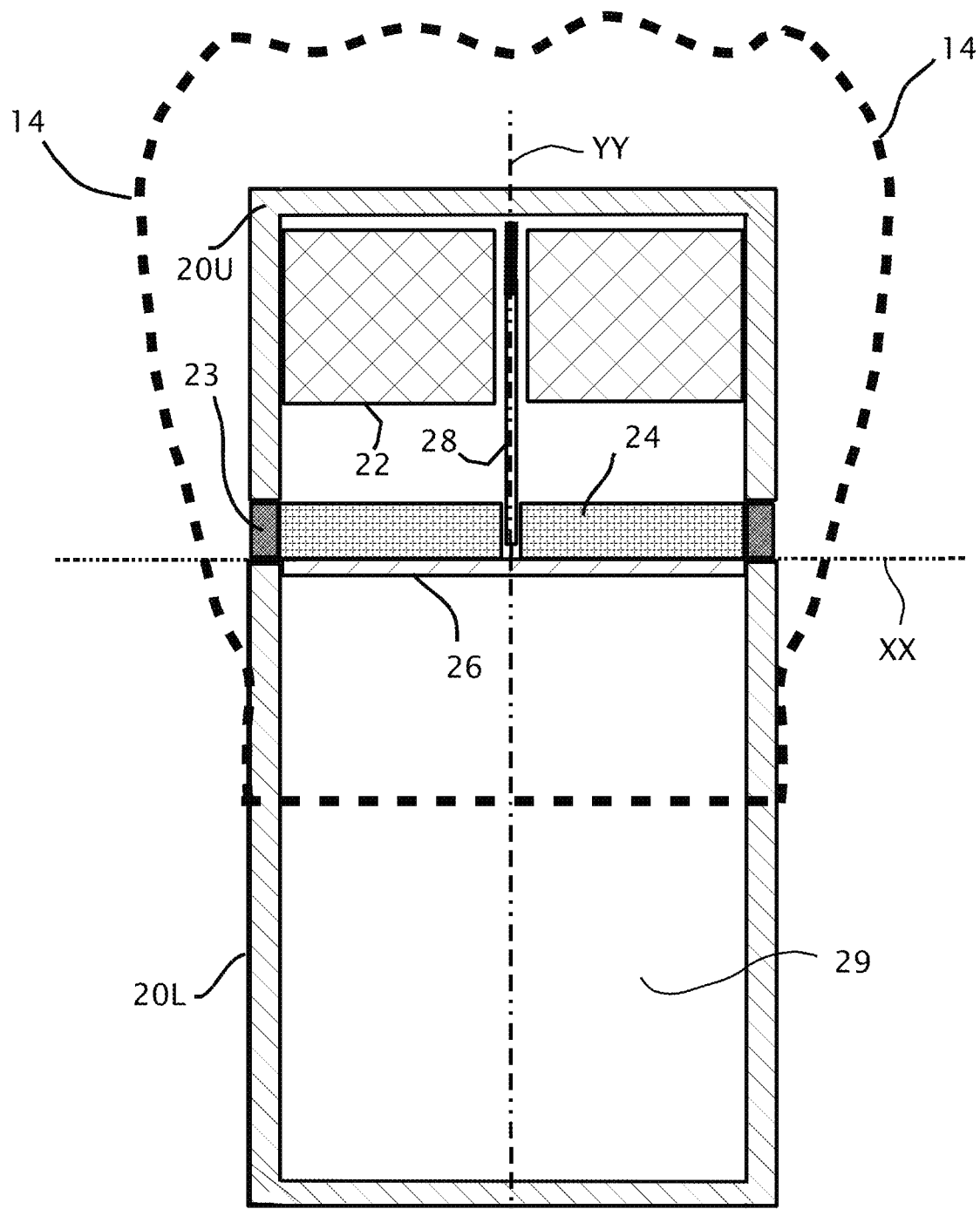
FIG. 2a shows a more detailed cross sectional drawing of a canister, according to a feature of the present invention.

Reference is now made to FIG. 2a which shows a more detailed cross sectional drawing of canister 20, according to feature of the present invention. The more detailed cross sectional drawing of canister 20 is shown in a non-activated mode. A folded portion of air bag 14 is shown along with the opening or mouth of air bag 14 hermetically attached to canister 20. Shown are two sections to canister 20. Section below axis XX is the sealed compartment for compressed gas 29. Compressed gas 29 may be carbon dioxide ($CO_2$) or other appropriate gas such as nitrogen or air. Lower compartment 20L for compressed gas 29 is sealed by seal 26, e.g. foil seal, and supported by a moveable support 24 such as a disk or piston in position as shown adjacent to foil seal 26. Piston 24 in position as shown provides support to foil seal 26 to withstand the pressure of compressed gas 29 in canister 20L lower compartment.

The upper section 20U of canister 20 above axis XX includes piston 24, plunger 28, apertures 23 and solenoid 22. Plunger 28 is moveable downward and optionally upward along longitudinal axis YY by virtue of activation of solenoid 22 by application of an electrical signal applied to wires (not shown) of solenoid 22. Plunger 28 may pass through piston 24 by virtue of a hole in piston 24. Piston 24 may have a frictional contact with the walls of canister 20 parallel to axis YY and is also moveable back and forth along axis YY. The frictional contact with the walls of canister 20 may be by use of an 'O' ring around the perimeter of piston 24 and the inner wall of canister 20U upper compartment.

Alternatively, the section 20U above axis XX may have one or more apertures 23 and one or more pneumatic pipes or tubes may be hermetically attached between the air bag 14 and apertures 23 using appropriate pneumatic glands and seals known in the art.

Figure 2B:
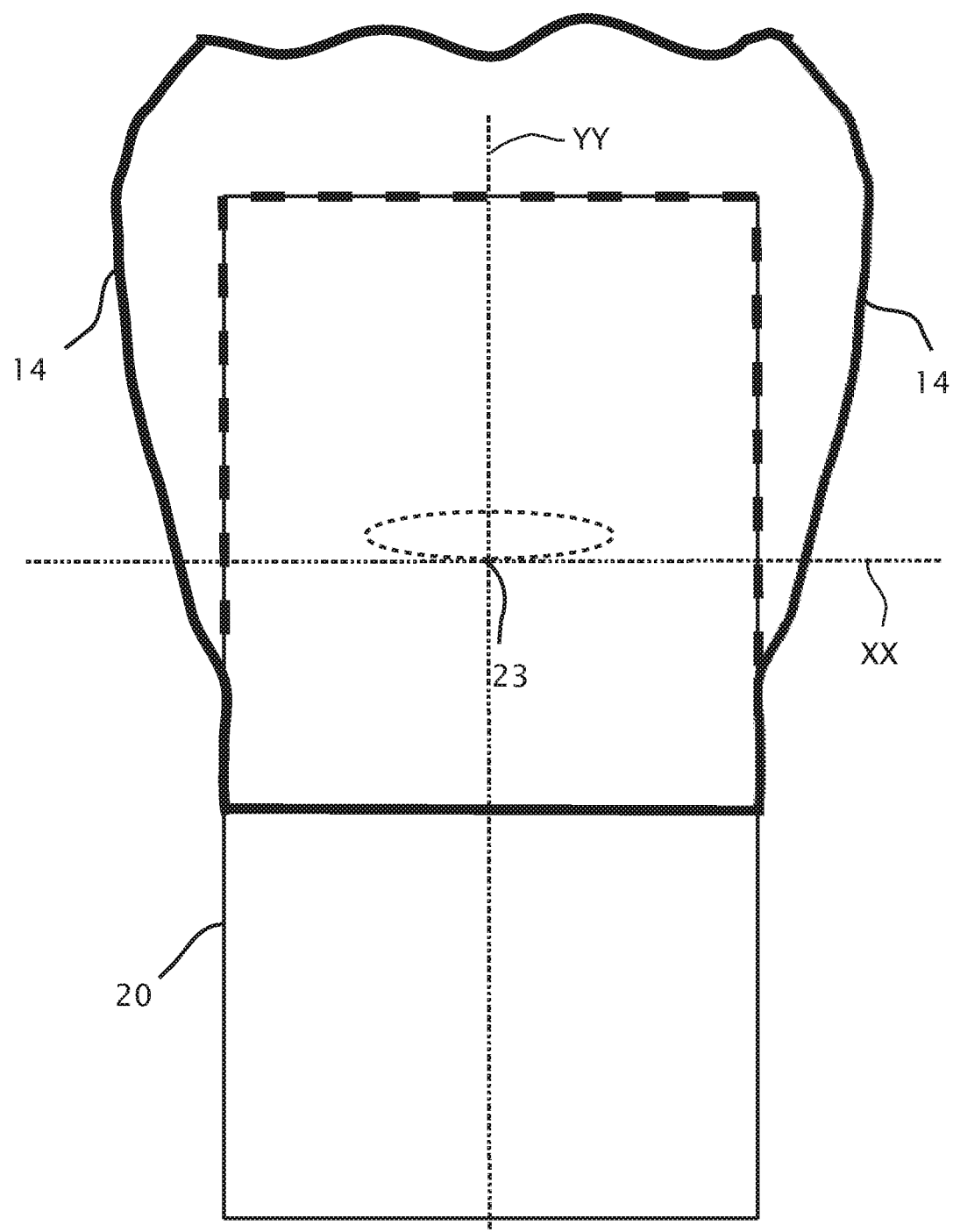
FIG. 2b shows a side view drawing of the canister shown in FIG. 2a, according to features of the present invention.

Reference is now also made to FIG. 2b which shows a side view drawing of canister 20 according to a feature of the present invention. The side view drawing shows aperture 23 as an ellipse (dotted) relative to the location of axis YY, XX, canister 20 and air bag 14. The air bag being expanded is as a result of gas 29 released from canister 20 into air bag 14 via apertures 23.

Figure 3A:
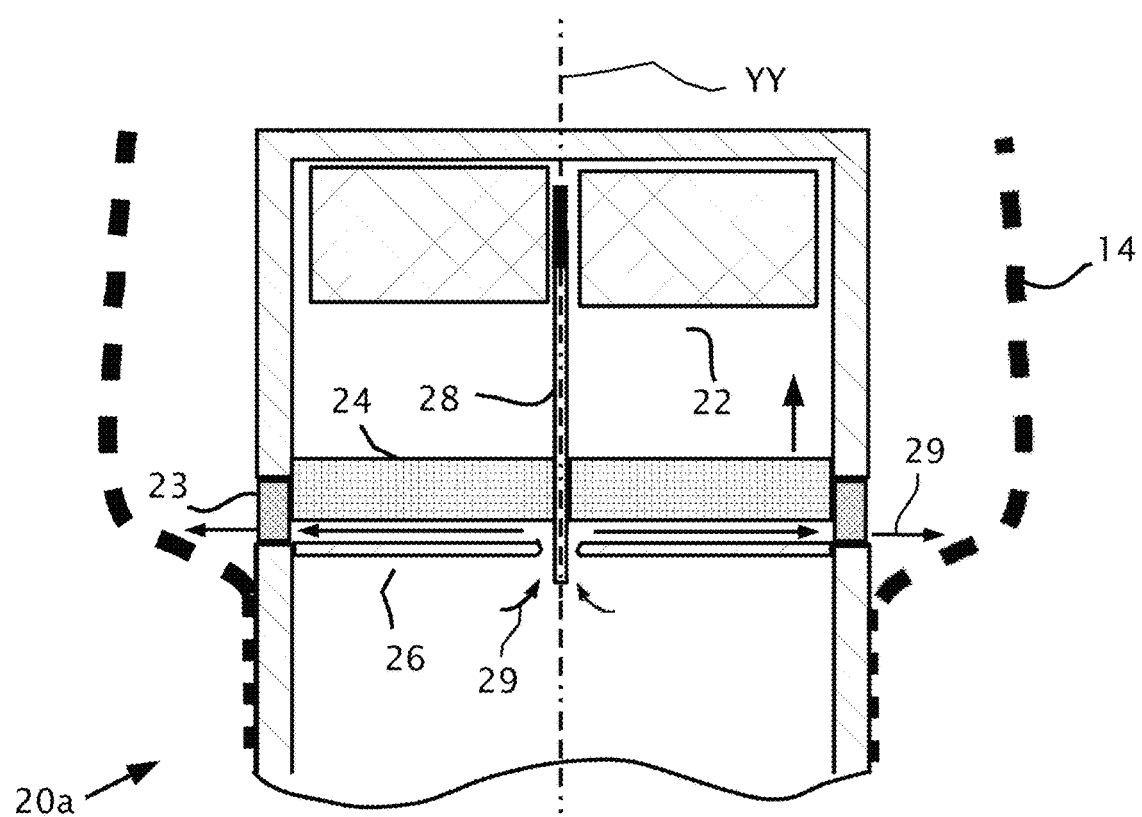
FIGS. 3a and 3b show respective drawings of partial views of the mechanism of the canister initially activated and after activation, according to features of the present invention.
Figure 3B:
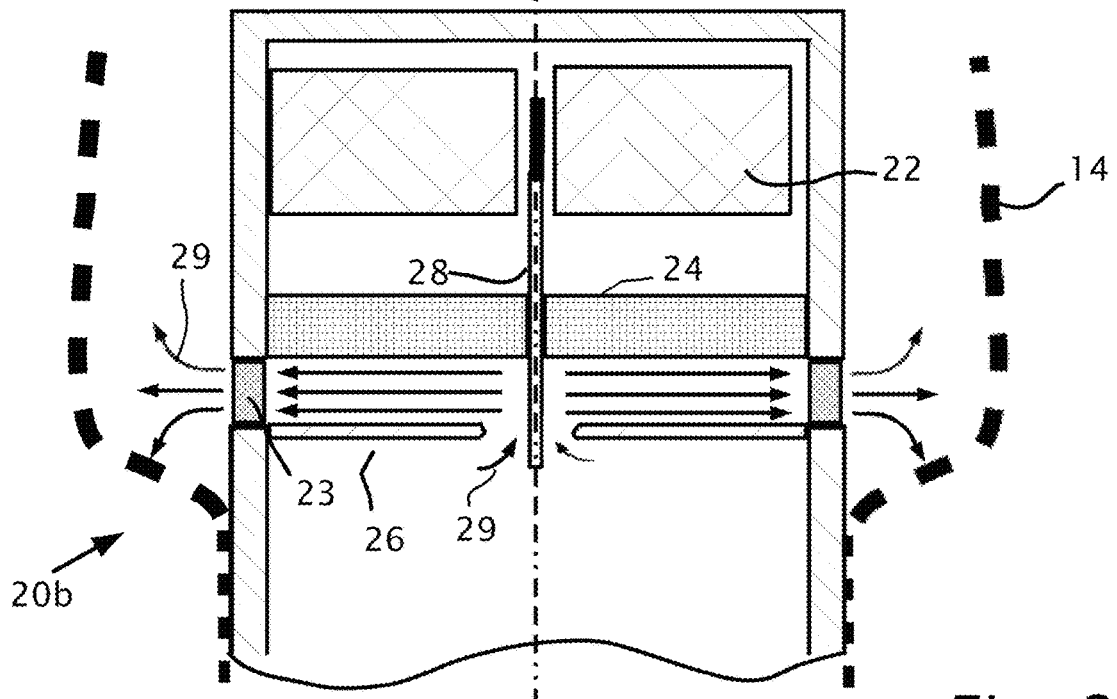
Figure 6:
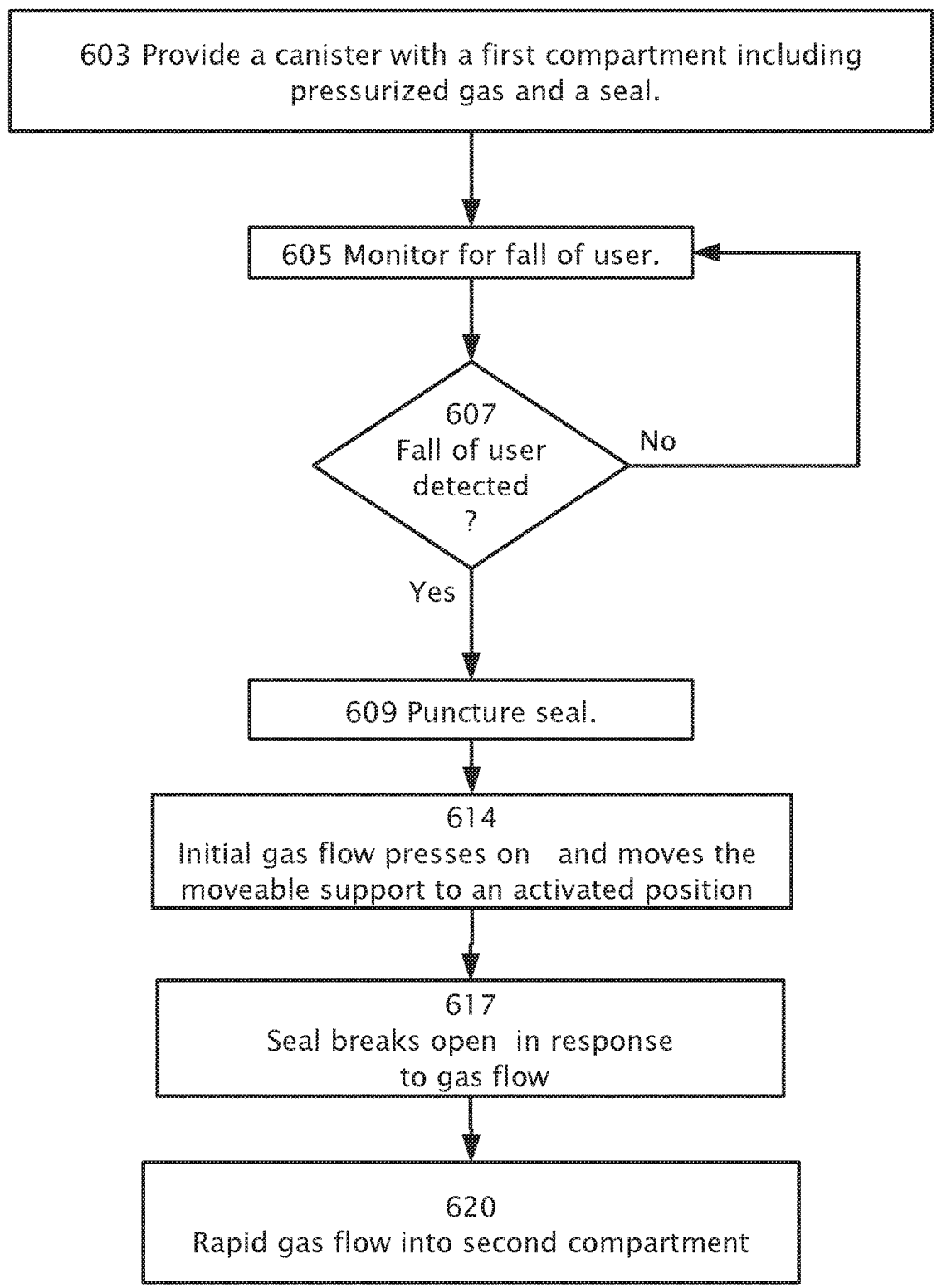
FIG. 6 shows a flow chart of a method, according to features of the present invention The foregoing and/or other aspects will become apparent from the following detailed description when considered in conjunction with the accompanying drawing figures.

Reference is still made again to FIG. 1, 2a and to FIGS. 3a and 3b which show drawings 20a and 20b respectively of partial views of the mechanism of canister 20 being activated, according to a feature of the present invention. Reference is also made to FIG. 6 which shows a flow diagram of a method 601, according to a feature of the present invention.

In step 603, canister 20 and air bag 14 are provided optionally in protection belt 12 worn by a person. Canister 20 includes a compartment 20L holding compressed gas 29. The compressed gas is sealed by foil seal 26 and piston 24 supporting foil seal 26 in position as shown in FIG. 2a. A second compartment 20U of canister 20 above axis XX includes piston 24, plunger 28, apertures 23 and solenoid 22.

In optional steps 605, 607, a potential fall of a user wearing belt 12 is monitored (step 605). In decision block 607, if the user is not in a fall situation, monitoring for a fall of the user continues in step 605. In decision block 607 if an imminent fall of the user is detected then an activation signal may be applied to solenoid 22 which causes plunger 28 to travel through the hole of piston 24 and puncture (step 609) foil seal 26 so as to provide at least an initial narrow opening in foil seal 26 as shown in FIG. 3a. The at least initial narrow opening in seal 26 causes gas 29 to flow (step 614) between foil seal 26 and piston 24 forcing piston 24 to travel upward towards solenoid 22 along axis YY into an activated position. Piston 24 is no longer supporting foil seal 26 and foil seal 26 breaks open (step 617) by virtue of the high pressure and rush of flowing gas 29 into second compartment 20U. Gas may rapidly flow (step 620) into second compartment 20U and optionally through apertures 23 to rapidly expand air bag 14. Thus, as a result of foil seal 26 being pierced and the movement of piston 24 into an activated position not supportive of foil seal 26, a wide path for the release of gas 29 towards apertures 23 is created between foil seal 26 and piston 24.

Figure 4A:
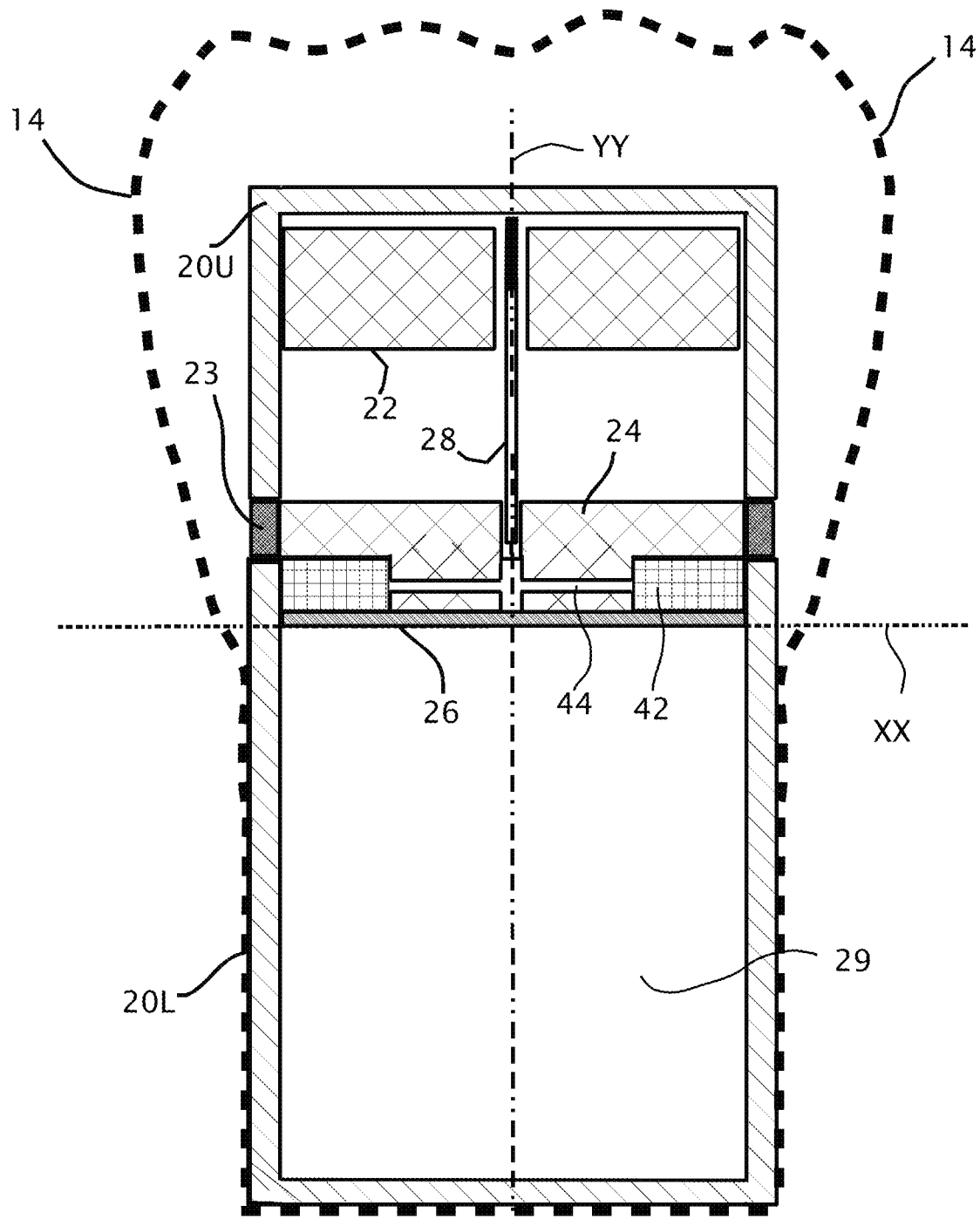
FIG. 4a shows a mechanism according to other features of the present invention.

Reference is now made again to method 601 and to FIG. 4a which shows a detailed cross sectional drawing of canister 20 in a non-activated position, according to features of the present invention. Canister 20 is provided (step 603) for instance in protection belt 12 worn by a person. Canister 20 is shown in a non-activated mode. A folded portion of air bag 14 is shown along with the opening of air bag 14 hermetically attached to canister 20.

Shown are two sections to canister 20 as in FIG. 2a. The section below axis XX is sealed compartment 20L for compressed gas 29. Upper compartment 20U includes moveable piston 24, plunger 28, apertures 23 and solenoid 22. Compartment 20L is sealed by foil seal 26 supported by moveable piston 24 disposed adjacently thereto. Moveable piston 24 may be frictionally held in place.

Plunger 28 is moveable downward along long axis YY by virtue of activation of solenoid 22 through a vertical hole in piston 24 parallel to axis YY. At the lower portion of piston 24 is a horizontal bore 44 joining the vertical hole through piston 24 which allows downward travel of plunger 28. Horizontal bore 44 in moveable piston 24 goes through to part 42. Part 42 functions to support foil seal 26 and acts as an end stop for moveable piston 24. In the non-activated position as shown, piston 24 additionally blocks and seals apertures 23.

Figure 4B:
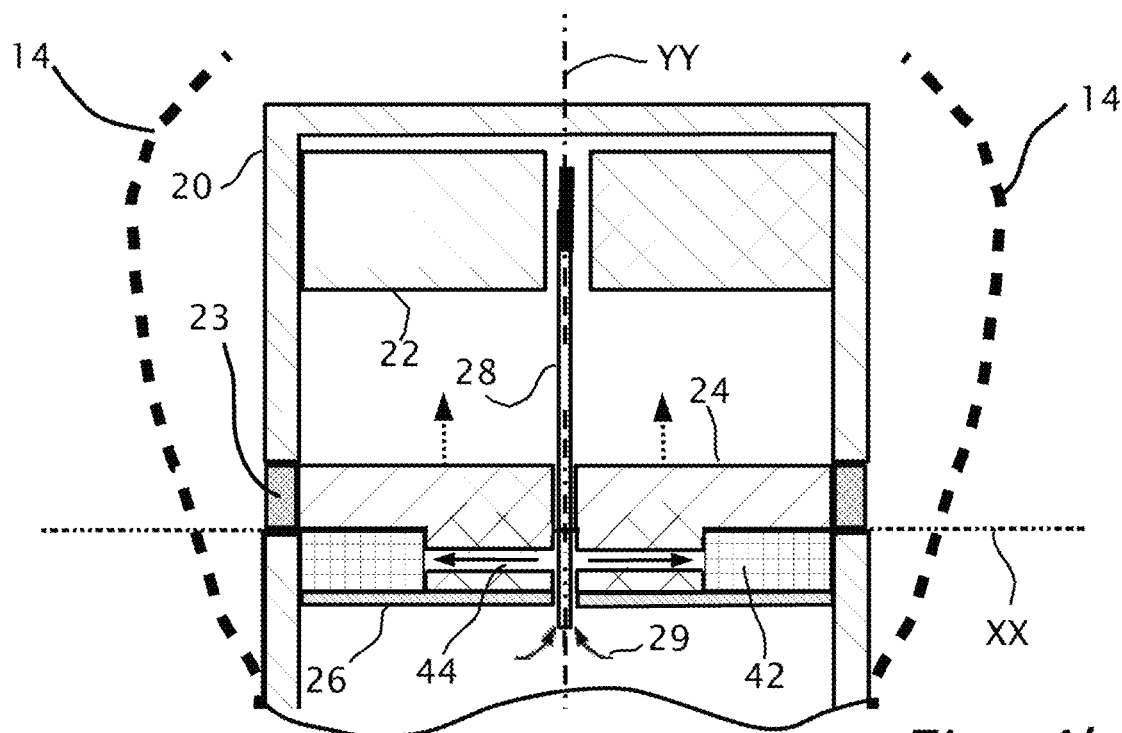
FIG. 4b shows the mechanism of FIG. 4a in an initially activated state, according to a feature of the present invention.
Figure 4C:
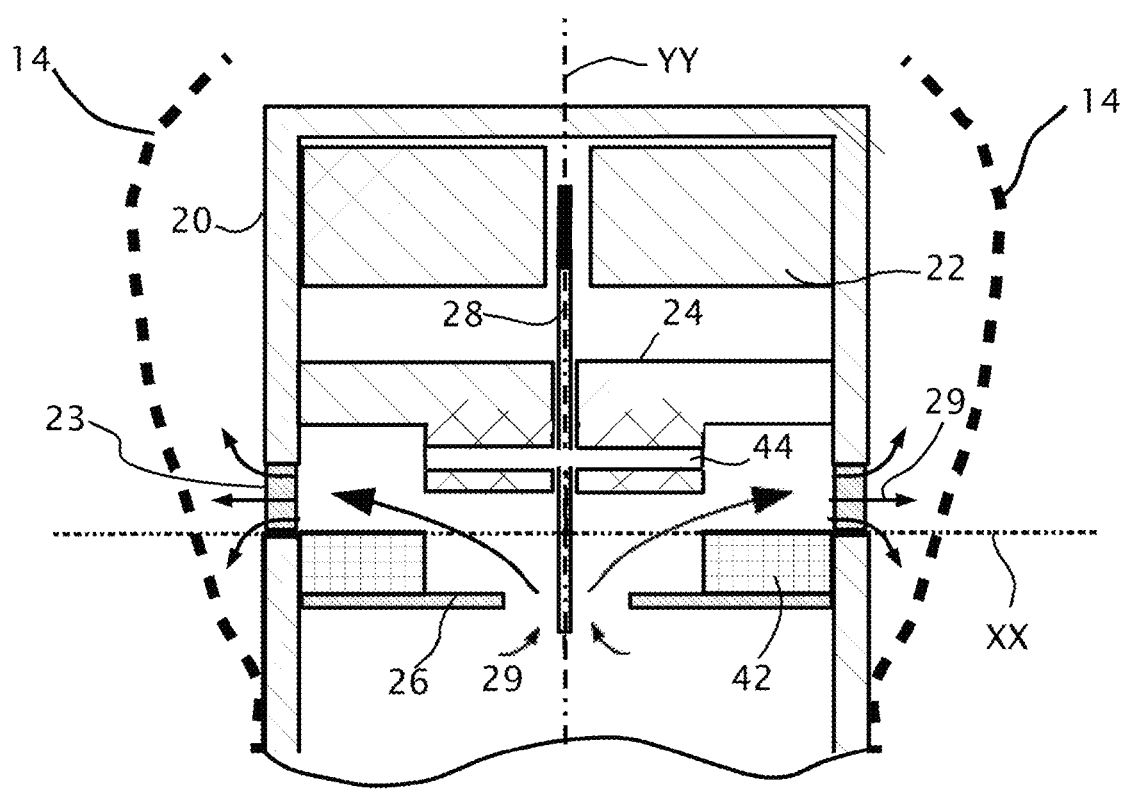
FIG. 4c shows the mechanism of FIG. 4a in an activated state, according to a feature of the present invention.

Reference is now made also to FIGS. 4b and 4c which show canister 20 initially activated and fully activated respectively. Solenoid 22 is activated (step 609) so that plunger 28 is forced downward to puncture foil seal 26 as shown in FIG. 4b. Gas 29 passes around plunger 28 through hollow bores 44. Expansion of the gas into horizontal bores 44 causes piston 24 move upwards as shown by dotted arrows in FIG. 4b.

In FIG. 4c, piston 24 moves upwards as initial gas flow. through horizontal bore 44 enters the space created between piston 24 and part 42. As moveable piston 24 moves upward, gas 29 may exit canister 20 through apertures 23 which are now unblocked.

Figure 5:
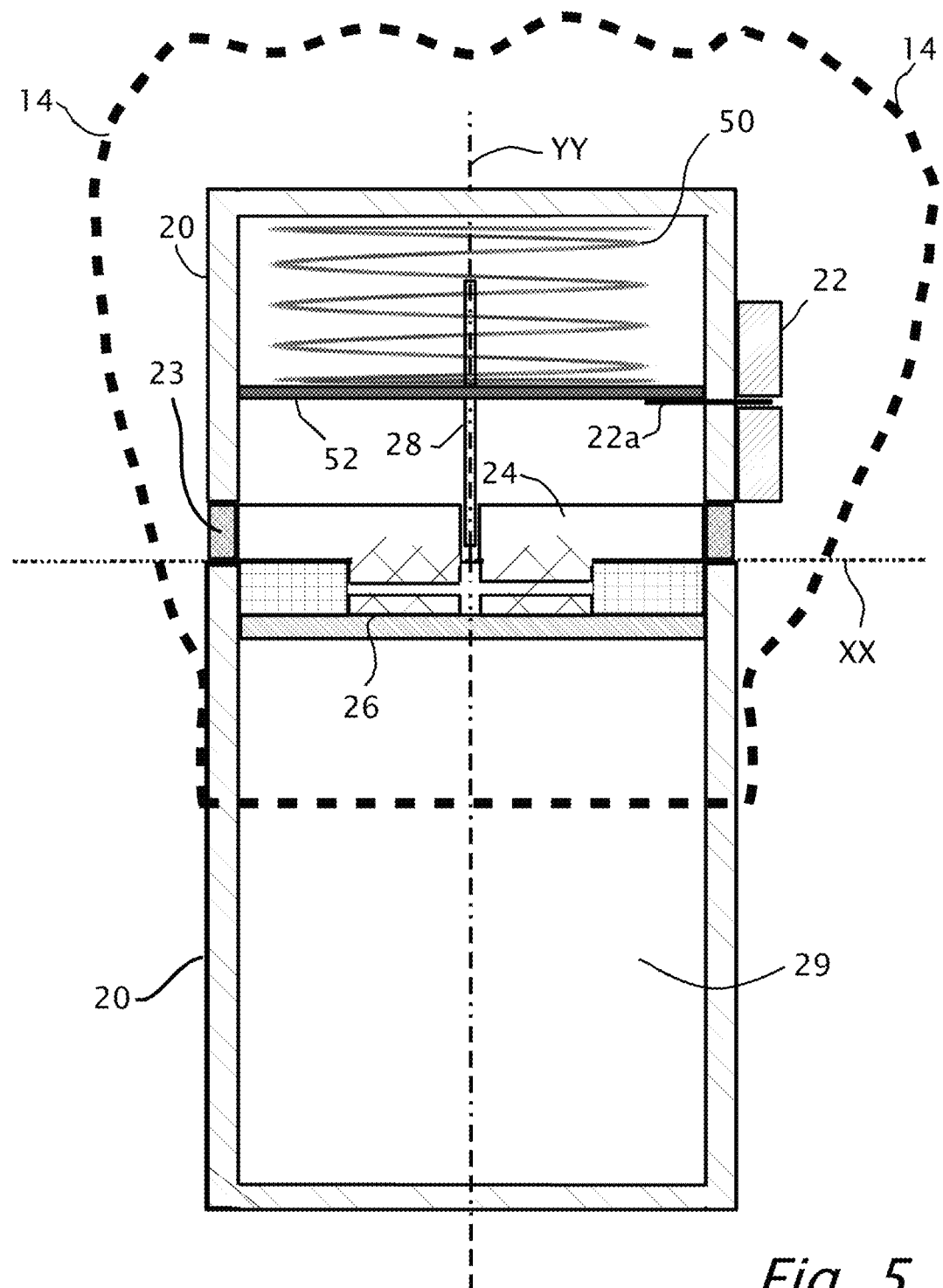
FIG. 5 shows a mechanism according to other features of the present invention

Reference is now made to FIG. 5 which shows a drawing of an alternative embodiment of canister 20, according to features of the present invention. Canister 20 is shown in a non-activated mode. Canister 20 shown in FIG. 5 is similar to canister 20 shown in FIG. 4a except that solenoid 22 is mounted on the outside of canister 20. Plunger 22a of solenoid 22 holds disc 52 in place. Disc 52 moveable along axis YY, is mechanically attached to plunger 28 and maintains a spring 50 compressed between disc 52 and the top of canister 20.

As a result of a detection that an imminent fall of a user has been detected (step 607), solenoid 22 is activated so that plunger 22a no longer retains disc 52 to maintain spring 50 compressed. As a result of solenoid 22 being activated, disc 52 attached to plunger 28 travels downwards as spring 50 decompresses and foil seal 26 is punctured by plunger 28 (step 609). Operation is otherwise similar to that previously described with respect to FIGS. 4b and 4c above.

The terms "plunger", "needle", "knife" and "pin" are used herein interchangeably.

The terms "piston" and "disc" are used herein interchangeably.

The terms "disposed" and "located" are used herein interchangeably.

The terms "mouth", "throat" and "opening" with respect to an air bag are used herein interchangeably.

The terms "canister" and "cylinder" are used herein interchangeably.

The articles "a", "an" is used herein, such as "an air bag", "a mechanism", "a solenoid" have the meaning of "one or more" that is "one or more air bags", "one or more mechanisms" and "one or more solenoids".

The present application is gender neutral and personal pronouns 'he' and 'she' are used herein interchangeably.

The features of the various embodiments described herein may be combined with one another.

The disclosure of U.S. patent application 62/077,242 from which this application claims priority is incorporated herein by reference.

Although selected features of the present invention have been shown and described, it is to be understood the present invention is not limited to the described features. Instead, it is to be appreciated that changes may be made to these features without departing from the principles and spirit of the invention, the scope of which is defined by the claims and the equivalents thereof.

The invention claimed is:
1. An apparatus comprising:
a canister including a first compartment and a second compartment;
wherein the first compartment is configured to contain a compressed gas;
a seal between the first compartment and the second compartment configured to seal the compressed gas inside the first compartment;
wherein the second compartment includes:
a moveable support adjacent to the seal and configured to support the seal in a non-activated position; and
a puncture mechanism configured to puncture the seal to cause thereby an initial gas flow from the first compartment into the second compartment, wherein the puncture mechanism includes a solenoid configured to move a plunger, wherein the plunger is configured to initially puncture the seal to cause the initial gas flow, without breaking the moveable support;
wherein the initial gas flow subsequent to puncture, presses on and moves the moveable support to an activated position away from supporting the seal, wherein in absence of the moveable support adjacent to the seal, the seal breaks open in response to pressure and gas flow from the first compartment to the second compartment to enable rapid gas flow from the first compartment into the second compartment.

2. The apparatus of claim 1, further comprising:
an aperture located in a wall of the second compartment, wherein the moveable support in the non-activated position is configured to block the aperture and in the activated position the moveable support is configured to unblock the aperture to allow gas in the second compartment to rapidly escape externally from the canister.

3. The apparatus of claim 2, further comprising:
an air bag including a mouth hermetically attachable external to the canister, wherein the aperture is internal to the airbag so that the escaped gas through the aperture from the second compartment enters the air bag.

4. The apparatus of claim 2, further comprising:
an air bag which completely encloses hermetically said canister, wherein the aperture is internal to the airbag so that the escaped gas through the aperture from the second compartment enters the air bag.

5. The apparatus of claim 2, further comprising:
an air bag including a mouth;
a pneumatic pipe hermetically attached between the mouth of the air bag and the aperture.

6. The apparatus of claim 1, wherein the seal includes a foil located between the first compartment and the second compartment.

7. The apparatus of claim 1, wherein the puncture mechanism includes:
a compressed spring coupled to a needle, wherein the needle is configured to initially puncture the seal to cause the initial gas flow when the spring is decompressed.

8. The apparatus of claim 1, wherein the moveable support includes a piston, wherein the canister includes a cylinder having a longitudinal axis and movement of the piston within the cylinder is along the longitudinal axis.

9. The apparatus of claim 8, further comprising:
a bore in the piston; wherein initial gas flows at least in part through the bore and forces the piston to move along the longitudinal axis of the cylinder.

10. The apparatus of claim 1, wherein the apparatus is wearable by a user to protect the user from injury, wherein the apparatus is activated prior to impact with the ground.

11. A method including:
providing a canister including a first compartment and a second compartment; wherein the first compartment is configured to contain a compressed gas;
providing a seal between the first compartment and the second compartment configured to seal the compressed gas inside the first compartment;

supporting the seal by a moveable support in a non-activated position adjacent to the seal within the second compartment;

providing a puncture mechanism including a solenoid configured to move a plunger;

the plunger puncturing the seal, without breaking the moveable support, thereby causing an initial gas flow from the first compartment into the second compartment, wherein the initial gas flow subsequent to the puncturing presses on and moves the moveable support to an activated position not supporting the seal; and in absence of the moveable support adjacent to the seal, breaking open of the seal in response to pressure and gas flow from the first compartment to the second compartment thereby enabling rapid gas flow from the first compartment into the second compartment.

12. The method of claim 11, wherein an aperture is located in a wall of the second compartment, the method further comprising:

blocking the aperture by the moveable support in the non-activated position; and unblocking the aperture by moving the moveable support to the activated position to allow gas in the second compartment to rapidly escape externally from the canister.

13. The method of claim 12, furthering comprising:

attaching a mouth of an air bag hermetically external to the canister, wherein the aperture is internal to the airbag so that escaped gas through the aperture from the second compartment enters the air bag.

14. The method of claim 12, further comprising:

attaching an air bag to completely enclose hermetically said canister, wherein the aperture is internal to the airbag so that escaped gas through the aperture from the second compartment enters the air bag.

15. The method of claim 12, further comprising:

attaching hermetically a pneumatic pipe hermetically between a mouth of an air bag and the aperture.

16. The method of claim 11, wherein said enabling the rapid gas flow from the first compartment into the second compartment while avoiding use of an explosive or pyrotechnics.

* * * * *